July 9, 1963 M. KOFFLER 3,097,126
VACUUM EVAPORATOR WITH A CLIMBING AND FALLING FILM
Filed March 1, 1961 2 Sheets-Sheet 1

Inventor
MAXIMILIAN KOFFLER
By Blum, Moscovitz,
Friedman & Blum
Attorneys

July 9, 1963  M. KOFFLER  3,097,126
VACUUM EVAPORATOR WITH A CLIMBING AND FALLING FILM
Filed March 1, 1961  2 Sheets-Sheet 2
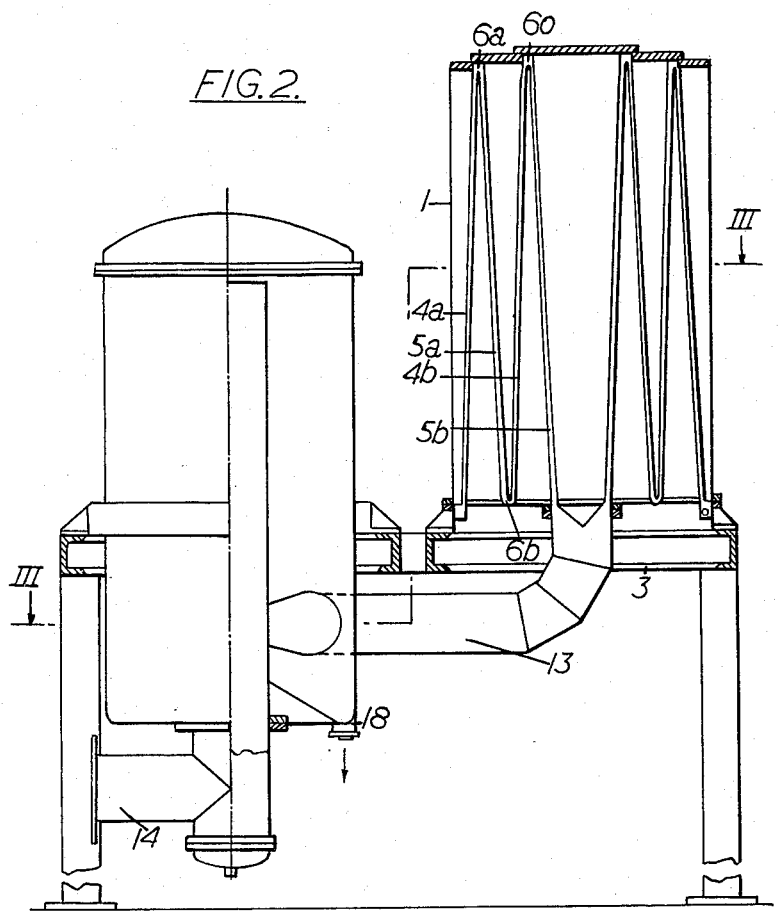
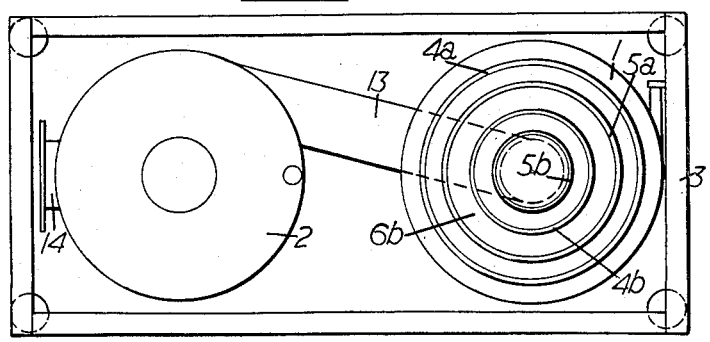
Inventor
MAXIMILIAN KOFFLER
By Blum, Moscovitz,
Friedman & Blum
Attorneys

United States Patent Office

3,097,126
Patented July 9, 1963

3,097,126
VACUUM EVAPORATOR WITH A CLIMBING
AND FALLING FILM
Maximilian Koffler, 17 Maharal St., Tel-Aviv, Israel
Filed Mar. 1, 1961, Ser. No. 92,523
Claims priority, application Israel Dec. 30, 1960
6 Claims. (Cl. 159—15)

This invention relates to vacuum evaporators suitable for the concentration of fruit juices and other liquids, more particularly evaporators of the kind sometimes referred to as "climbing- and falling-film evaporators."

In connection with evaporators or concentrators of this kind it has already been suggested to provide, within the evaporating vessel, an odd number (e.g. three) of upright heat exchange walls circular in horizontal section or plan view, disposed coaxially within each other. While those walls are heated from the outside by means of steam or any other suitable heating medium, the liquid to be concentrated is fed to the top zone of the inner surface of the outermost heat exchange wall and allowed to flow down by gravity along this surface into a trough formed in the bottom of the evaporating vessel, then pumped upwards along the inner surface of the second heat exchange wall and over the top of the latter, and then allowed to flow down by gravity over the inner surface of the third heat exchange wall into a receiver from which it is discharged. The first and third heat exchange walls slope conically inwards from the top to the bottom, whereby their surface area is gradually reduced in accordance with the decrease of volume of the liquid by evaporation. These known concentrators have a high degree of efficiency but they require a number of movable working parts apt to produce trouble in prolonged operation, such as rotary blades sweeping across the first and third heat exchange surfaces at a small distance from them in order to spread the descending liquid into a thin film; a rotary impeller or the like member for lifting the liquid along the second surface; a rotary vertical shaft disposed in the common axis of the heat exchange walls and carrying the blades as well as the impeller; and a motor for rotating the shaft.

The present invention aims at providing a vacuum evaporator having alternately falling and rising coaxial heat exchange surfaces and being operated without the aid of movable working parts.

The invention consists in a vacuum evaporator comprising a calandria including a conduit system for the liquid to be concentrated and a separator connected in series with each other and with means for producing a state of reduced pressure in the conduit system and a separator; the conduit system being constituted by a series-connected sequence of alternating rising and descending coaxial annular channels formed between heat exchange walls, of which channels the outermost one is connected to a feed conduit, and the innermost one to a discharge conduit leading to the separator.

The width of the channels, measured at right angles to the heat exchange walls, should be so small that the liquid to be concentrated is spread out in a thin sheet with a high ration of surface:volume per unit of weight of the liquid.

In its simplest form the conduit system comprises one outer rising channel and one inner descending channel interconnected at their top ends. A more elaborate conduit system may comprise, for example, an outermost rising channel connected at the top to a first descending channel, a second rising channel connected at the bottom to the first descending channel, and an innermost descending channel connected at the top to the second rising channel.

Since the channels are disposed coaxially and each inner channel has therefore a smaller diameter than the preceding outer channel, the surface area of the heat exchange walls delimiting the channels grow smaller from channel to channel. If the heat exchange walls have substantially cylindrical shape the decrease of diameter and of surface area is sudden at the transition from channel to channel. It is preferred, however, to make the walls of the rising channels upright-conical and those of the descending channels inverted-conical. In such a conduit system the decrease of the channel diameters and of the surface area of the heat exchange walls is gradual from the inlet end of the conduit system down to the discharge end.

The flow of the liquid through the conduit system and its discharge into the separator is mainly caused by the action of the vacuum-producing means, e.g. a vacuum pump or the liquid-feed pump.

The separator may be of any suitable known type for example, a cyclone-type of separator is appropriate.

The invention is illustrated, by way of example only, by the accompanying drawings in which:

FIG. 2 shows similarly an evaporator according to a second embodiment of the invention, of which FIG. 3 is a cross-section on line III—III of FIG. 2.

Figure 1:
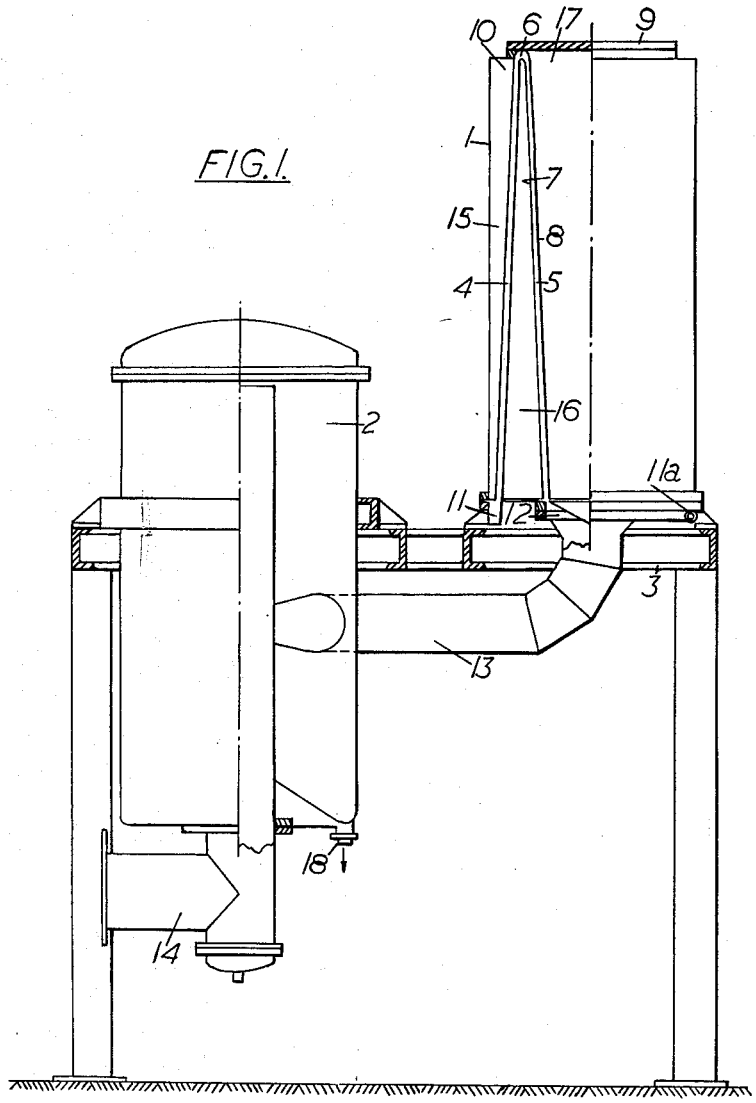
FIG. 1 is an elevation, partly in axial section, of an evaporator according to a first embodiment of the invention.

The evaporator illustrated in FIG. 1 comprises an upright cylindrical calandria 1 and a separator 2, both mounted on a steel frame 3.

The calandria encloses a liquid-conduit system comprising a rising upright-conical channel 4 and a descending inverted-conical channel 5. The downstream end of the former merges into the upstream end of the latter in a transition channel 6 at the top of the conduit system. The channel 6 projects somewhat above the inwards bent rim 10 of the calandria and serves as a seat for a lid 9. The heat exchange walls 7 and 8 delimiting the channels 4, 5 and 6 are constituted by two corrugated or undulating metal sheets superposed at a small distance from each other. Preferably the two sheets are mounted individually in the calandria by any suitable means (not shown). When the lid 9 is removed the wall 8 can in that case be lifted out of the calandria and the channels can be cleaned without requiring the removal of the wall 7 from the calandria. The bottom end of the channel 4 opens into an annular duct 11 located at the bottom end of the calandria. This duct is connected to an exterior supply pipe (not shown) which is preferably disposed in substantially tangential position to the duct. The bottom end of channel 5 opens into a receiver 12 formed in the bottom of the calandria and the receiver is connected by a discharge conduit 13 to the cyclone 2.

The cyclone is connected by an exhaust pipe 14 to a vacuum pump which creates a state of reduced pressure in the entire system of the conduits 4 and 5, duct 13 and cyclone 2 and evacuates the vapours producted by evaporation. The concentrate is discharged through an outlet 18.

Steam inlets and condensate outlets (not shown) are connected to the spaces 15, 16 and 17 of the calandria, respectively enclosed by the cylindrical wall of the calandria and the channel 4, the two channels 4 and 5, and the channel 5.

By means of the evaporator described above, natural liquors, e.g. citrus fruit juice, can be concentrated at a high ratio of concentration, e.g. 1:7, by a single pass of the liquor through the evaporator and within an extremely short time, being of the order of a few minutes. The evaporator is, therefore, suitable for the concentration of heat-sensitive liquids, as these are exposed to the temperature of concentration for a very short time only. In practice the heat applied to the apparatus need not exceed the one corresponding to a steam pressure of 2 kg./cm.$^2$ gauge pressure.

The evaporator shown in FIGS. 2 and 3 is substantially similar to that shown in FIG. 1, except that the outer pair of rising and descending channels $4a$, $5a$ is followed by an inner pair of rising and descending channels $4b$, $5b$. The transition $6b$ between the bottom (downstream) end of the channel $5a$ and the bottom (upstream) end of the channel $4b$ is located at the bottom of the calandria. The transitions $6a$ between channels $4a$ and $5a$, and $6c$ between channels $4b$ and $5b$, are located at the top of the calandria.

By the increase of the heat exchange surface area, as compared with the embodiment of the invention shown in FIG 1, and even greater evaporating capacity is obtained.

I claim:

1. A vacuum evaporator comprising, in combination, a calandria including a conduit system for the liquid to be concentrated by evaporation; a separator having an inlet connected to the outlet of said calandria by a discharge conduit; the conduit system being constituted by a series-connected sequence of alternating rising and descending coaxial annular channels formed between heat exchange walls, the outermost one of said channels being connected to a feed conduit and the innermost one of said channels being connected to said discharge conduit; and means connecting a source of sub-atmospheric pressure to said separator to provide a sub-atmospheric pressure within said separator, discharge conduit and conduit system, whereby the flow of liquid through said vacuum evaporator is effected substantially entirely by the sub-atmospheric pressure.

2. A vacuum evaporator according to claim 1, wherein said conduit system of the calandria comprises one outer rising annular channel and one inner descending annular channel interconnected at their top ends.

3. A vacuum evaporator according to claim 1, wherein said outermost one of said channels is a rising annular channel; said conduit system further including a first descending annular channel, connected at the top to said outermost rising annular channel, and a second rising annular channel connected at the bottom to said first descending annular channel; said innermost annular channel being a descending annular channel connected at the top to said second rising annular channel.

4. A vacuum evaporator according to claim 1, wherein said outermost one of said channels is a rising annular channel; said conduit system including an annular duct positioned at the bottom end of said outermost rising annular channel; said feed conduit comprising an exterior supply pipe communicating with said annular duct.

5. A vacuum evaporator according to claim 1, wherein the calandria comprises a pair of inner and outer annular corrugated metal sheet elements having inverted V-shaped radial sections and disposed in superposed spaced relation to conjointly form a series connected sequence of alternating rising and descending coaxial annular channels; said sheet elements being mounted individually in the calandria and the outer sheet element being removable from the calandria independently of the lower sheet element.

6. A vacuum evaporator according to claim 4, wherein said supply pipe communicates substantially tangentially with said annular duct.

References Cited in the file of this patent
UNITED STATES PATENTS

| | | |
|---|---|---|
| 64,321 | Irving | Apr. 30, 1867 |
| 492,300 | Jonsson | Feb. 21, 1893 |
| 1,062,133 | Vouga | May 20, 1913 |
| 1,090,628 | Kestner | Mar. 17, 1914 |
| 2,122,228 | Goehler | June 28, 1938 |
| 2,836,235 | Koffler | May 27, 1958 |